(12) United States Patent
Hadziomerovic

(10) Patent No.: US 6,977,931 B1
(45) Date of Patent: Dec. 20, 2005

(54) ROUTING DATA

(75) Inventor: Faruk S. Hadziomerovic, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 882 days.

(21) Appl. No.: 09/688,582

(22) Filed: Oct. 16, 2000

(51) Int. Cl.[7] .............................................. H04L 12/56
(52) U.S. Cl. ..................................... 370/392; 370/238
(58) Field of Search ............................... 370/235, 238, 370/238.1, 351, 389, 392

(56) References Cited

U.S. PATENT DOCUMENTS

| | | | | |
|---|---|---|---|---|
| 5,031,093 A | * | 7/1991 | Hasegawa | 364/200 |
| 5,577,030 A | * | 11/1996 | Oki et al. | 370/351 |
| 5,754,543 A | * | 5/1998 | Seid | 370/351 |
| 6,400,681 B1 | * | 6/2002 | Bertin et al. | 370/218 |

OTHER PUBLICATIONS

John D. Spragins, Joseph L. Hammond, and Krzyszt of Pawlikowski, "Routing and Flow Control", Addison-Wesley 1994, pp. 355-369.
Information Sciences Institute, Request for Comments 791, "Internet Protocol—Darpa Internet Program, Protocol Specification", Sep. 1981, pp. 1-50.
S. Deering, Cisco, R. Hinden, Nokio, Network Working Group, Request for Comments 2460 Entitled "Internet Protocol, Version 6 (IPv6) Specification", Dec. 1998, pp. 1-36.

* cited by examiner

*Primary Examiner*—Ricky Ngo
*Assistant Examiner*—Derrick W Ferris
(74) *Attorney, Agent, or Firm*—Trop Pruner & Hu, PC

(57) ABSTRACT

A method is provided that comprises storing a first data structure containing costs associated with transmitting data between routers in a network. The method includes combining the first data structure with itself to determine a cost of transmitting the data. The method further comprises transmitting the data along a route based on the calculated cost.

29 Claims, 6 Drawing Sheets

470

ROUTING DATA

TECHNICAL FIELD

The invention relates generally to networks, and, more particularly, to routing signals efficiently over a network.

BACKGROUND

Communication networks are widely used to link various nodes, such as personal computers, servers, gateways, and the like. Communication networks may include private networks, for example, local area networks (LANs) and wide area networks (WANs), or public networks as in the Internet. Popular forms of communications across such networks include electronic mail, file transfer, web browsing, and other exchanges of data.

With the increased capacity and reliability of communications networks, transmission of real-time information, such as voice and streaming video, over networks has become possible. The ability to transfer a wide variety of information has made communication networks a popular choice of communication amongst users, as evidenced by the emergence of the Internet, for example. The popularity of networks as an attractive mode of communication has resulted in increased traffic, thereby making today's networks more prone to congestion, particularly during peak hours.

To avoid network congestion, developers routinely employ routing algorithms to determine efficient paths from source to destination nodes. Generally, routing algorithms perform two main functions—selecting routes between the source and destination nodes and delivering messages to the intended destination after the routes have been determined. The latter function of delivering messages to the intended destination involves use of data structures known as routing tables to deliver messages. The former function of selecting routes typically involves a collection of routing algorithms executing at different nodes that exchange services or perhaps information.

It is desirable that routing algorithms correctly and expeditiously determine efficient routes to transmit data. Inefficient routing may delay the delivery of data, or even cause data to be lost, which may lead to network congestion.

A need thus exists for an improved method and apparatus of routing data within a communications system.

SUMMARY

In general, according to one embodiment, a method comprises storing a first data structure containing costs associated with transmitting data between routers in a network. The method comprises combining the first data structure with itself to determine a cost of transmitting the data. The method further comprises transmitting the data along a route based on the calculated cost.

Some embodiments may have one or more of the following advantages. A reliable and efficient method and apparatus are provided for routing data from a source to a destination node. In one embodiment, a data packet may be transmitted to its intended destination in a "cost" efficient manner, where the cost may be one or more of the factors including physical distance, delay, expense, reliability, bandwidth, load, and security between nodes.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
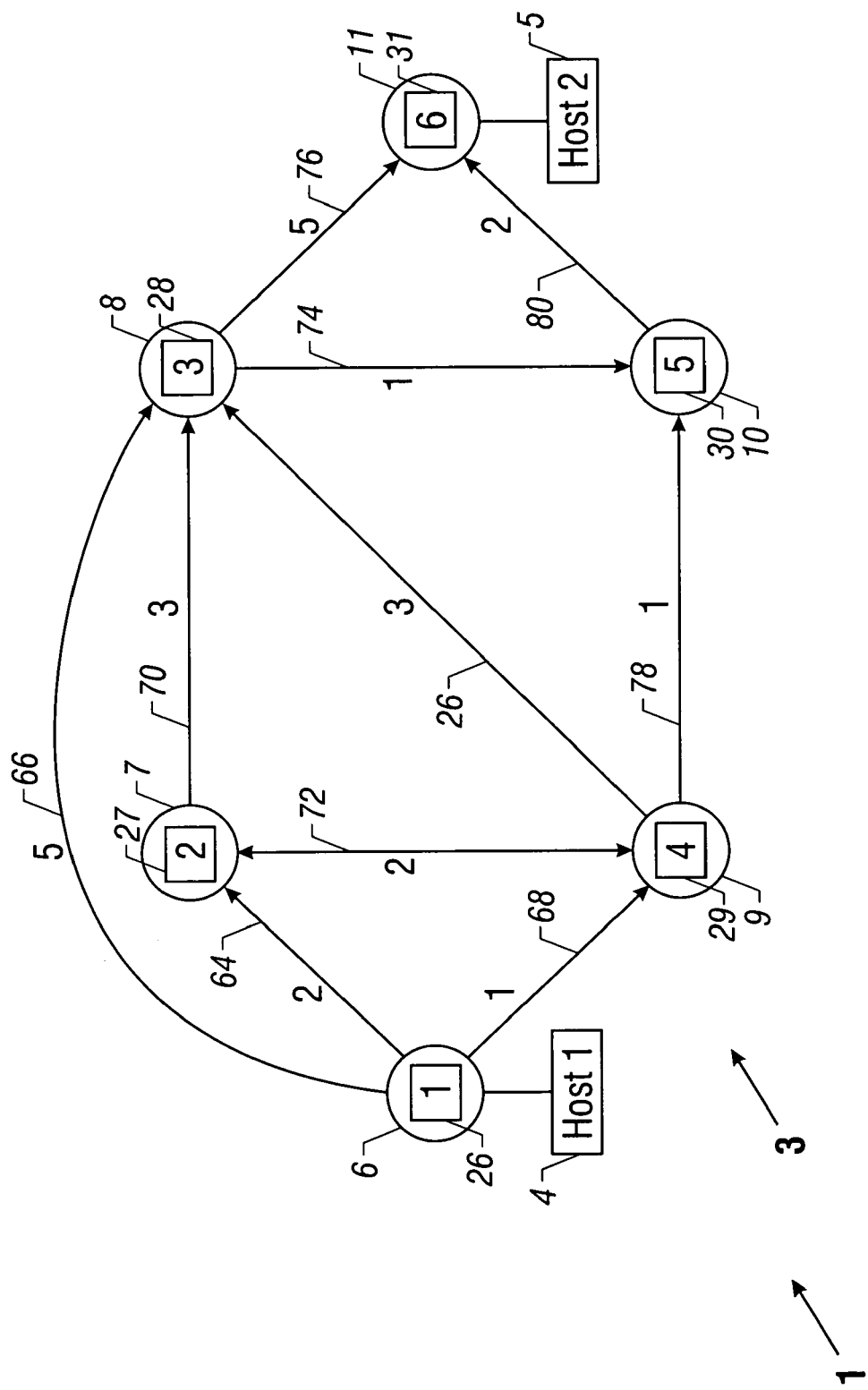
FIG. 1 is a block diagram of an embodiment of a communications system in accordance with the present invention.

Referring now to FIG. 1, an exemplary communications system 1 comprising a network 3 in accordance with one embodiment of the present invention is illustrated. In one embodiment, the network 3 may be a packet-based network, such as an Asynchronous Transfer Mode (ATM) network or an Internet Protocol (IP) network. As utilized herein, the term "network" may be one or more communications networks, channels, links, or paths and systems or devices (such as routers) used to route data over such networks, channels, links, or paths.

The ATM standard is established by the International Telegraph and Telephone Consultative Committee Communications (CCITT) Standards Organization. One version (Version 4) of IP is described in Request for Comments (RFC) 791, entitled "Internet Protocol," dated September 1981. Another version of IP is IPv6, as described in RFC 2460, entitled "Internet Protocol, Version 6 (IPv6) Specification," dated December 1998. In an ATM network, packets or cells are used to communicate information.

Although not so limited, in the illustrated embodiment, the network is an IP network. The IP network is a connectionless packet-switched network in which routing of packets is based on a source and destination address carried in each packet. The packets can travel independently over any path (and possibly over different paths) to a destination point identified by the destination address carried in the packets. Thus, in an IP network, the packets may even arrive out of order.

The network 3 comprises two hosts 4–5 and six nodes 6–11. In one embodiment, the hosts 4–5 may be computers that are part of local area networks. The six nodes 6–11 are linked to each other directly, or through one or more nodes 6–11. For ease of illustration, only six nodes 6–11 are illustrated, although the network 3 may include fewer or more than six nodes. Similarly, the network 3 may include additional or fewer than two hosts 4–5. In one embodiment of the invention, each node 6–11 includes a router 26–31, which may be implemented in a computer, server, gateway, internet device, and the like. Internet devices may include televisions, appliances, or any other device capable of interfacing with the network 3.

Each router 26–31 determines the next network node to which a data packet is forwarded before the data packet ultimately arrives at its final destination. As described more fully below, in accordance with one embodiment of the instant invention, one more of the routers 26–31 in the network 3 determine an efficient route to deliver data packets to the final destination. A router 26–31 may be located at any junction of networks or in gateways, including at an Internet point of presence (POP). A POP is the access point to the Internet, and has a unique Internet address. Independent service providers or online service providers typically have a point of presence on the Internet.

Routers 26–31 typically create or maintain a table of the available routes and the route conditions and use this information to determine the best route for a given packet. The packet may travel through a number of network nodes, and hence through several routers, before arriving at its final destination.

As shown, the first node 6 is coupled to the second node 7 over a first link 64, to the third node 8 over a second link 66, and to the fourth node 9 over a third link 68. The second node 7 is coupled to the third node 8 over a fourth link 70 and the fourth node 9 over a fifth link 72. The third node 8 is coupled to the fifth and sixth nodes 10, 11 over the sixth and seventh links 74, 76, respectively. The fourth node 9 is coupled to the second node 2 over the fifth link 72, to the third node 8 over an eighth link 76, and to the fifth node 10 over a ninth link 78. The fifth node 10 is coupled to the sixth node 11 over an eleventh link 80. For illustrative purposes, the fourth link 72 is depicted as a bi-directional link, while the other links 64, 66, 68, 70, 74, 76, 78, 80 are unidirectional; however, it should be appreciated that the network 3 may include any combination of unidirectional or bi-directional links.

Each link may have a "cost" associated with it. The "cost," as used herein, may, in one embodiment, represent one or more of the following: physical distance, delay, expense, reliability, bandwidth, load, or security between nodes. Physical distance is typically the sum of the distance associated with each link traversed, or, alternatively, may be defined in terms of "hop count," which refers to the number of passes through internetworking products, such as routers, that a packet takes en route from a source to a destination node. Reliability typically refers to the dependability (usually described in terms of the bit-error rate) of each network link. Routing delay, which may depend on the bandwidth of intermediate network links, the port queues at each router along the way, network congestion on all intermediate network links, and the like, usually refers to the length of time required to move a packet from a source to destination node. Bandwidth typically refers to the available traffic capacity of a link, while load refers to the degree to which a network resource, such as a router, is busy. Load can be calculated in a variety of ways, including central processing unit (CPU) utilization and packets processed per second. Communication expense refers commonly to the expenditure associated with transmitting data packets from a source to destination node. Security typically refers to the level of security associated with each link or path. In alternative embodiments, the "cost" may be any other standard of measurement upon which it is desirable to determine routing. The cost may be different for different directions on the same link.

For illustrative purposes, exemplary costs are shown between the nodes 6–11 of the network 3. Although not so limited, the cost associated with each link in the illustrated embodiment represents the physical distance between any two particular nodes. For instance, the cost between the first node 6 and second, third, and fourth nodes 7, 8, 9, is two, five, and one, respectively. The cost between second node 7 and third and fourth nodes 8, 9 is three and two, respectively. The cost between the third node 8 and the fourth, fifth, and sixth nodes 9, 10, 11, is three, one, and five, respectively. The cost between the fourth and fifth nodes 9, 10 is one, and the two between the fifth and sixth nodes 10, 11.

Figure 2:
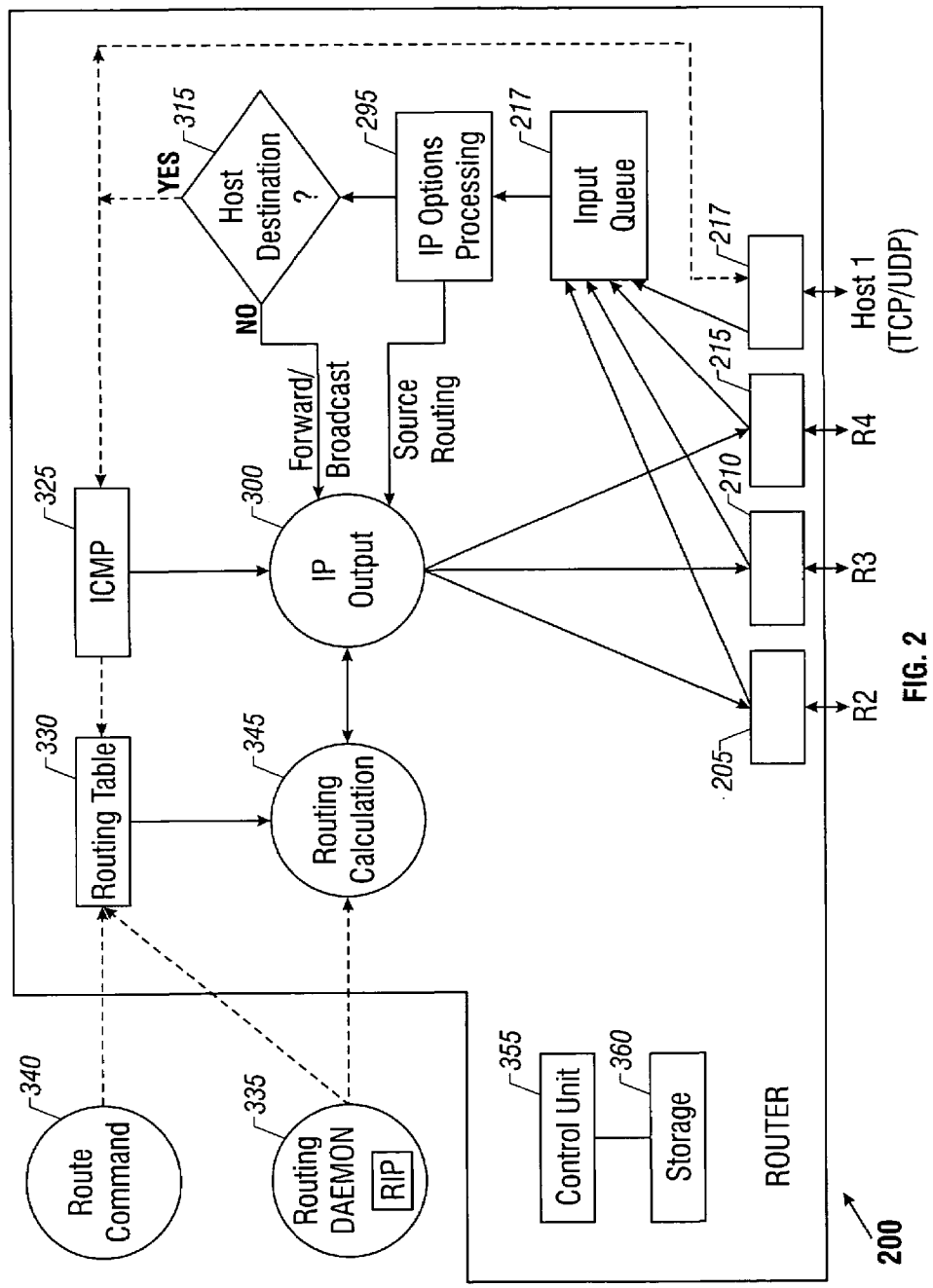
FIG. 2 is a block diagram of a router that may be employed in the communications system of FIG. 1.

In accordance with one embodiment of the instant invention, one or more of the routers 26–31 determine a "cost" efficient route for data packets between a source and destination node. FIG. 2 depicts one embodiment of a router 200 in accordance with the present invention. While the router 200 of FIG. 2 may be implemented at any or all of the nodes 6–11 in the network 3 of FIG. 1, for ease of illustration it is herein assumed that the router 200 represents the first router 26 at the first node 6 of the network 3.

Figure 3:
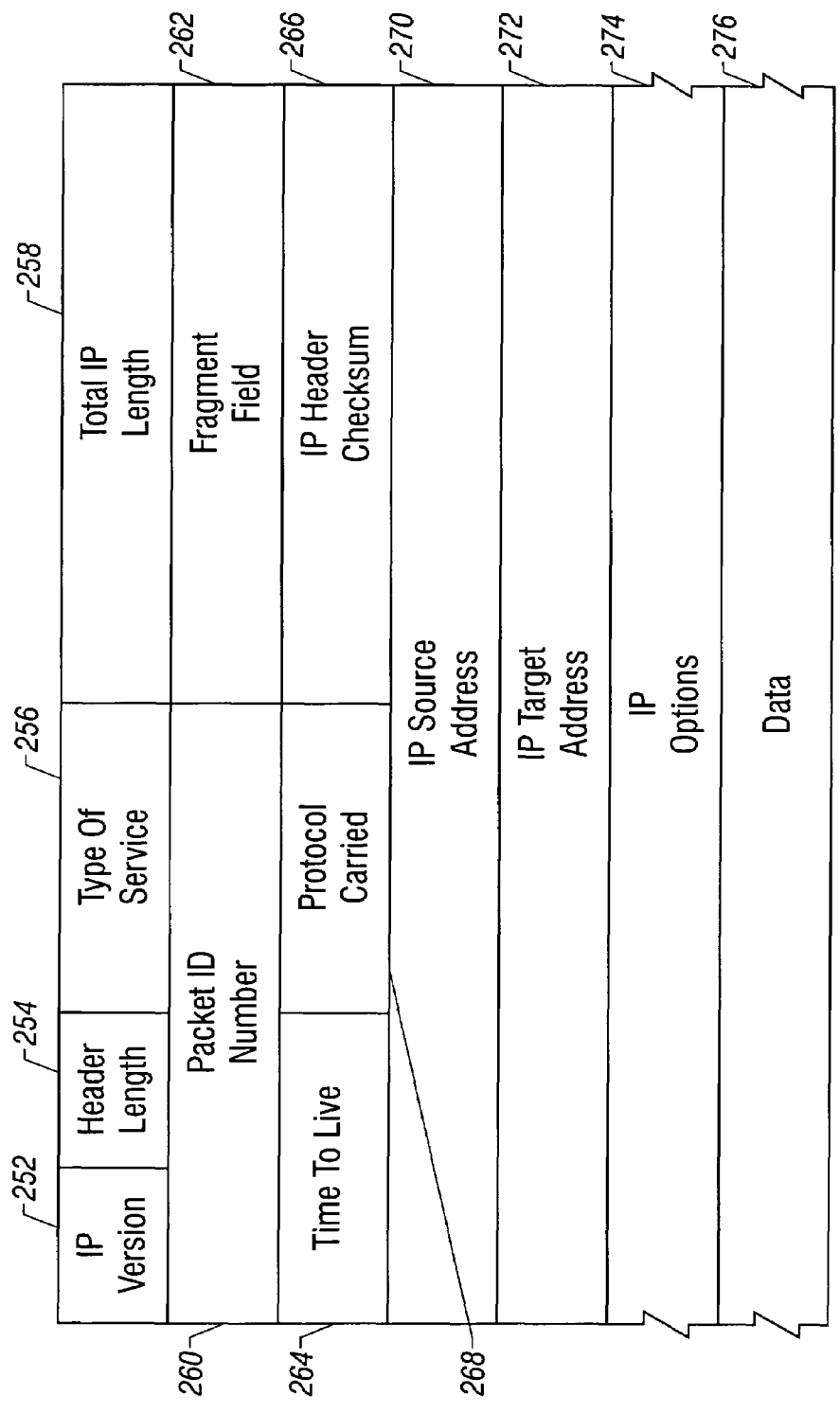
FIG. 3 illustrates an exemplary data packet 250 that may be communicated in the communications system of FIG. 1.

The router 200 comprises first, second, and third interfaces 205, 210, 215, that are respectively coupled to the routers 27, 28, 29 at the second, third, and fourth nodes 7, 8, 9 (see FIG. 1), respectively. A fourth interface 216 is provided for interfacing with the first host 4. The router 200 comprises an input queue 217 for receiving data packets from the first, second, third and fourth interfaces 205, 210, 215, 216. An exemplary structure of an IP data packet 250 is illustrated in FIG. 3. The data packet 250 comprises an IP version field 252 that indicates the current IP version. A header length field 254 is provided for identifying the length of the header of the IP data packet 250. The data packet 250 comprises a type of service field 256 that allows the data packet 250 to be delivered based on a variety of service factors, such as delay, throughput, reliability, expense, and the like. Thus, it is possible to transmit the data packet 250 through a route that presumably has the least amount of delay, highest throughput, least chance of getting lost, or least cost.

The data packet 250 comprises a total IP length field 258 for indicating the total length of the data packet 250, including the IP header and the accompanying data. The maximum length for the IP data packet 250, for example, is 65,535 bytes (for IPv4). The data packet 250 may also include other fields, such as the packet ID number, fragment, and time-to-live, and IP header checksum fields 260, 262, 264, 266. A protocol carried field 268 identifies a higher layer protocol, such as Transmission Control Protocol (TCP), User Datagram Protocol (UDP), Internet Control Message Protocol (ICMP), and the like.

The data packet 250 comprises source and target address fields 270, 272. In Version 4 of the Internet Protocol, the source and target address fields 270, 242 of the data packet 250 are typically 4 bytes long. An options field 274 is provided in the data packet 250 for enabling measurement of time delay, routing messages, or specifying routing instructions. The options field 274, for example, may be utilized to specify data packet 250 route from source to destination by providing the intermediate routers that the data packet 250 should traverse. In Version 4 of the IP, for example, up to nine (9) intermediate routers may be specified between the source and destination. The data packet 250 also comprises a data field 276 that contains the data being transmitted.

Referring again to FIG. 2, the incoming data packets 250 are provided from the input queue 217 to an IP options block 295, which processes the options field 274 of each received data packet 250 to determine if source routing is specified. In alternative embodiments, the IP options block 295 may perform additional functions as well. If source routing is specified in the IP options field 274, the data packet 250 is provided to the IP output block 300, which forwards the data packet 250 to the next router specified in the options field 274 through the interfaces 205, 210, 215.

If the IP options block 295 determines source routing is not specified, then, at block 315, the router 200 determines if the data packet 250 is intended to be forwarded, broadcast, or delivered to the first host 4 coupled to the router 200. If the data packet 250 is to be forwarded or broadcast to other routers 27–31 on the network 3, then the data packet 250 is provided to the IP output block 300, which transmits the data packet 250 to the appropriate router or routers 27–31. If the data packet 250 is not intended to be forwarded or broadcast to other routers 27–31, it may be provided to a TCP or UDP layer for delivery to the first host 4 through the interface 216, or, alternatively, it may be delivered to an Internet Control Message Protocol (ICMP) block 325. The ICMP block 325 typically handles error and control messages for IP.

The router 200 includes a routing table 330 that in one embodiment contains information to aid the process of path determination. Routing information stored in the routing table 330 may vary, depending on the routing algorithm employed. The routing table 330 may include destination (next hop) associations that indicate to the router 200 that a particular destination may be reached efficiently by transmitting the data packet 250 to a particular router representing the "next hop" on the way to the final destination. In one embodiment, the routing table 330 may contain information about the "costs", in terms of delay, distance, and the like, that are associated with transmitting data packets 250 between routers.

Routers 26–31 (see FIG. 1) routinely communicate with one another and exchange messages to build a substantially detailed picture of network topology. The routing table 330 of the router 200 may be updated by a route command 340, routing daemon 335, or an ICMP redirect 325. The route command 340 to update the routing table 330 may be issued by an operator sitting at the host 4, for example. The routing daemon 335 is a software application that is capable of executing Routing Information Protocol (RIP), which is commonly used to periodically exchange routing information from other computers on the network 3 (e.g., about every 30 seconds).

In accordance with one embodiment of the present invention, a route calculation block 345 of the router 200 uses the information from the routing table 330 to calculate a "cost" efficient route for the packet data 250. One embodiment of a routing algorithm employed by the route calculation block 345 is described in more detail below. The route calculation block 345 determines an efficient route for delivering the packet data 250 and provides the routing information to the IP output block 300, which then forwards the packet data 250 to the next router based on the route determined by the route calculation block 345.

Selected portions of the router 200, such as the routing calculation block 345, may be implemented in hardware, software, or a combination thereof. In one embodiment, the router 200 may include software routines, modules, or drivers that may be executable on the control unit 245. Data instructions associated with the software routines may be stored in the storage unit 360.

Figure 4:
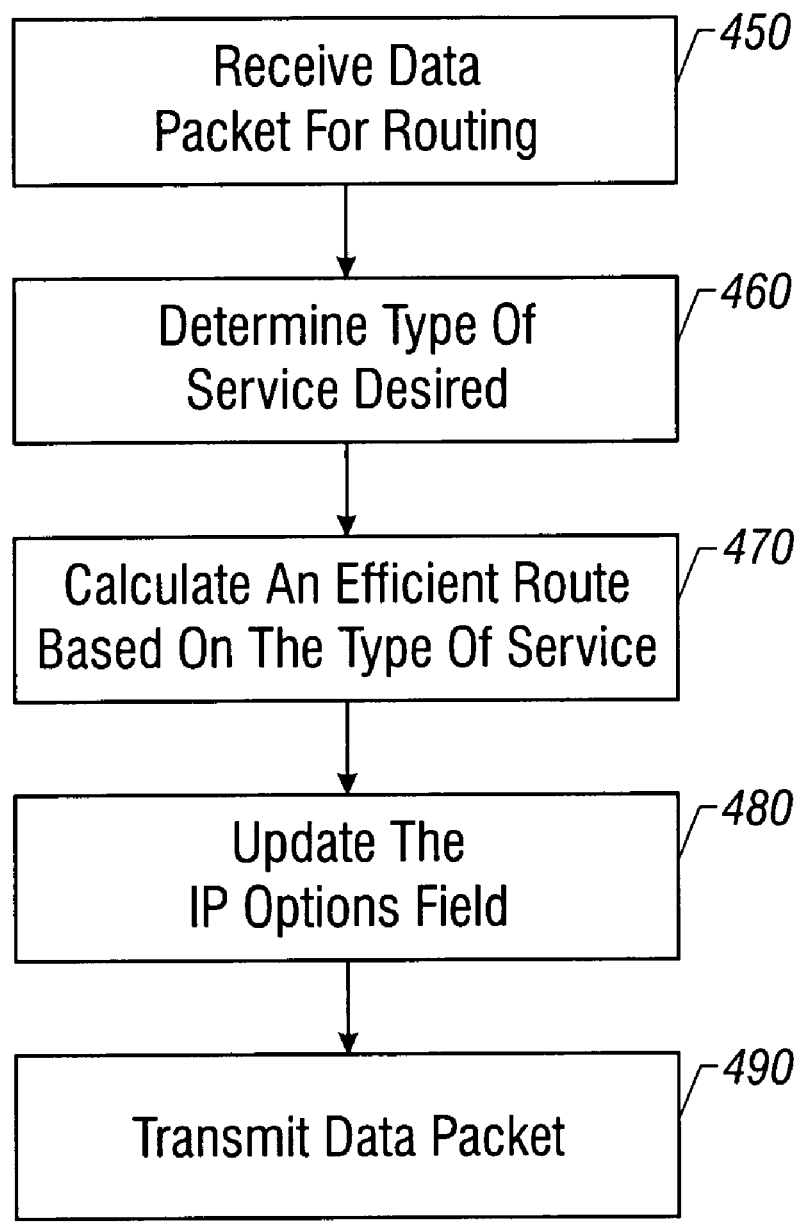
FIG. 4 is a flow diagram of a method in accordance with one embodiment of the present invention that may be implemented in the communications system of FIG. 1.

Referring now to FIG. 4, one method in accordance with the present invention of delivering data packets 250 efficiently over the network 3 based on one or more of the "costs" is illustrated. For illustrative purposes, the method of FIG. 4 is described in the context of transmission of the data packet 250 from the first host 4, which is coupled to the first router 26, to the second host 5, which is coupled to the sixth router 31. The method of FIG. 4 begins at block 450, where the first router 6 receives the data packet 250 from the first host 4 for delivery to the second host 5. Accordingly, the source address field 270 includes the IP address of the first host 4, and the target address field 272 includes the IP address of the second host 5. At block 460, the first router 26, based on the type of service field 256 of the data packet 250, determines the type of service that has been designated by the first host 4. That is, the first host 4 may, in one embodiment, designate that the data packet 250 be delivered to the second host 5 using the shortest route. In alternative embodiments, the first host 4 may designate that the packet data 250 be delivered using the least expensive route or the most reliable route, for example.

Figure 5:
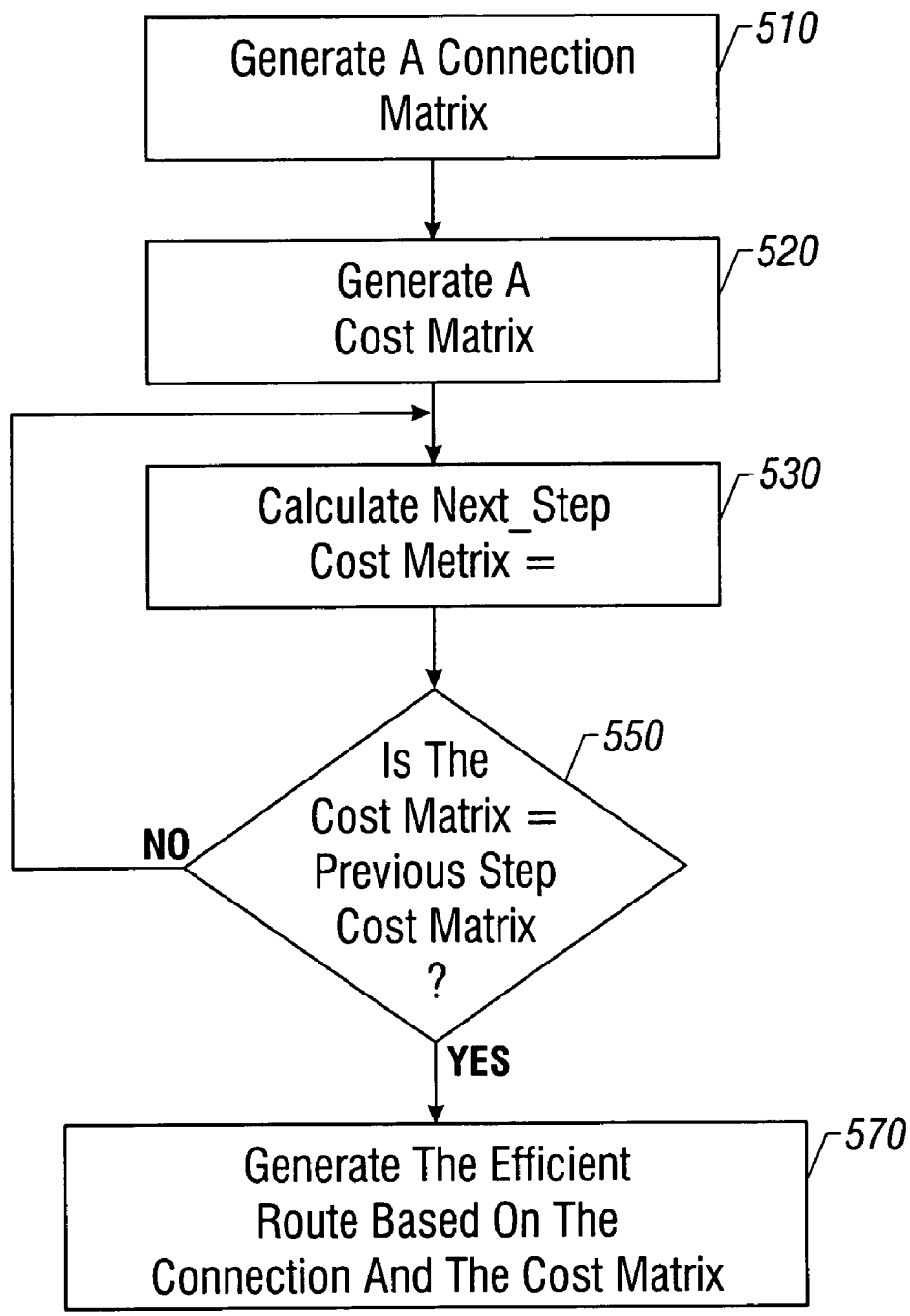
FIG. 5 is a flow diagram of a method in accordance with one embodiment of the present invention that may be implemented in the communications system of FIG. 1.

At block 470, the first router 26 calculates an efficient route based on the type of service designated by the first host 4. FIG. 5 illustrates one embodiment of the block 470. The method of FIG. 5 begins at block 510, where the route calculation block 345 of the first router 26 generates a "connection" data structure of the network 3. Although a variety of data structures may be utilized, in the illustrated embodiment the data structure utilized herein is a matrix. A connection matrix is provided that is representative of the network topology, where the connection matrix illustrates the adjacent nodes to each node. An exemplary connection matrix for the network 3 of FIG. 1 is as follows:

$$\text{Connection Matrix } C = \begin{vmatrix} 1 & 1 & 1 & 1 & 0 & 0 \\ 0 & 1 & 1 & 1 & 0 & 0 \\ 0 & 0 & 1 & 0 & 1 & 1 \\ 0 & 1 & 1 & 1 & 1 & 0 \\ 0 & 0 & 0 & 0 & 1 & 1 \\ 0 & 0 & 0 & 0 & 0 & 1 \end{vmatrix}$$

Since the network 3 of FIG. 1 comprises six nodes 6–11 (see FIG. 1), the above connection matrix has six rows and six columns. Each row of the connection matrix illustrates the adjacent nodes of each node. Numerals "1" and "0" denote whether nodes are adjacent to each other, in particular, numeral "1" denotes that two particular nodes are adjacent, while numeral "0" indicates no adjacency. For example, the first row, which comprises numerals "1 1 1 1 0 0," indicates that the first node 6 is adjacent to the second, third, and fourth nodes 7, 8, 9, but not to the fifth and sixth nodes 10, 11. Likewise, the second row, which comprises sequence "0 1 1 1 1 0 0," indicates that the second node 7 is adjacent to the third and fourth nodes 8, 9, but not to the first, fifth and sixth nodes 6, 10, 11. Similarly, rows third, fourth, fifth, and sixth rows depict the adjacent nodes for respective third, fourth, fifth, and sixth nodes 8–11.

The route calculation block 345 (see FIG. 2) may generate the data for the connection matrix in a variety of ways, including generating based on the information stored in the routing table 330. The routing table 330, in one embodiment, may include information regarding nodes that are adjacent to the first router 26. For example, the first router 26 may obtain routing table information about its adjacent nodes by submitting a layer 1 (Ethernet) broadcasting request to each of its interfaces 205, 210, 215. The routing table 330 may use routing protocols, such as Open Shortest Path First (OSPF) and Routing Information Protocol (RIP), to obtain data for the other rows. For example, the first router 26 may utilize "flooding" to acquire data for the other rows of the connection matrix. Flooding involves each router 26–31 periodically broadcasting its adjacent nodes to all its neighboring nodes. The neighboring node in turn forwards the received broadcast message, along with the information about its own neighboring nodes, to all of its neighbors. Accordingly, the routing table 330, in one embodiment, comprises information about the adjacent nodes of the first router 26, as well as about the adjacent nodes of other nodes in the network 3. The route calculation block 345, in one embodiment, accesses the routing table 330 to generate the connection matrix for the network 3.

At block 520, the route calculation block 345 generates a "cost" matrix. In the illustrated embodiment, the cost matrix is representative of the distance between nodes in the network 3. An exemplary cost (e.g., distance) matrix for the network 3 of FIG. 1 is depicted below:

$$\text{Distance Matrix } D = \begin{vmatrix} 1 & D^2 & D^5 & D & \infty & \infty \\ \infty & 1 & D^3 & D^2 & \infty & \infty \\ \infty & \infty & 1 & \infty & D & D^5 \\ \infty & D^2 & D^3 & 1 & D & \infty \\ \infty & \infty & \infty & \infty & 1 & D^2 \\ \infty & \infty & \infty & \infty & \infty & 1 \end{vmatrix}$$

As shown, although not so limited, in the illustrated embodiment, the cost factor is expressed as exponents for reasons explained in more detail later. In the illustrated embodiment of the cost matrix, the letter 'D' is a variable (without value) that stands for distance. The cost matrix has six rows and six columns since the network 3 of FIG. 1 has six nodes 6–11. Each row of the cost matrix depicts the minimum distance between a particular node and the remaining nodes in one step (i.e., hop). That is, for example, the first row depicts the minimum one-step distance between the first node 6 and the remaining nodes 7–11, while the second row depicts the minimum one-step distance between the second node 7 and the remaining nodes 1, 8–11, and so forth.

The first row, which comprises the sequence "1 $D^2$ $D^5$ D $\infty$ $\infty$" indicates that the minimum distance (expressed as exponents) in one step between the first node 6 and second, third, fourth nodes 7, 8, 9, is respectively 2, 5, and 1. The minimum one-step distance between the first node 6 and fifth and sixth nodes 10, 11 is infinity, since no direct connection exists between the first node 6 and fifth and sixth nodes 10, 11. The first element of the first row represents the distance between the first node 6 to itself. In this case, the first element of the first row is one because expressing the distance (i.e., zero) between the first node 6 and itself as an exponent yields one (i.e., $D^0$ equals 1). Similarly, the fourth row the cost matrix, which comprises the sequence "$\infty D^2$ $D^3$ 1 D$\infty$" illustrates that the minimum one-step distance between the fourth node 9 and the second, third, and fifth nodes 7, 8, 10 is 2, 3, 1, respectively. The fourth row also illustrates that no one-step connection exits between the fourth node 9 and first and sixth nodes (as denoted by the symbol $\infty$) 6, 11, while the distance between the fourth node 9 and itself is zero (denoted as one since $D^0$ equals 1).

The route calculation block 345 may, in one embodiment, generate data for the cost matrix in a similar way as the data for the connection matrix is generated. That is, flooding may be utilized to gather data for the cost matrix between each of the neighboring nodes in the network 3. Any other available means for obtaining the data for the cost matrix may be employed without deviating from the spirit of the instant invention.

At block 530, the route calculation block calculates a next_step matrix. The next_step matrix in one embodiment is calculated by combining the cost matrix with itself. The cost matrix is combined with itself in one embodiment using the following mathematical function:

next_step_cost matrix $(D^2_{ij})=\min_{k=1 \text{ to } 6}(D_{ik}*D_{kj})$, where i indicates the row and j indicates the column of the cost matrix (D), and k ranges from 1 to the number of nodes (e.g., six in the illustrated embodiment) in the network. The cost matrix, as described above, illustrates the minimum one-step distance between node i (row) and node j (column). In accordance with one embodiment of the present invention, combining the cost matrix with itself once using the above mathematical function yields a resultant matrix that illustrates the minimum distance between a particular node and the other nodes using two or fewer steps. The resultant next_step data structure in the illustrate embodiment is:

$$D^2_{ij} = \begin{vmatrix} 1 & D^2 & D^5 & D & \infty & \infty \\ \infty & 1 & D^3 & D^2 & \infty & \infty \\ \infty & \infty & 1 & \infty & D & D^5 \\ \infty & D^2 & D^3 & 1 & D & \infty \\ \infty & \infty & \infty & \infty & 1 & D^2 \\ \infty & \infty & \infty & \infty & \infty & 1 \end{vmatrix} \begin{vmatrix} 1 & D^2 & D^5 & D & \infty & \infty \\ \infty & 1 & D^3 & D^2 & \infty & \infty \\ \infty & \infty & 1 & \infty & D & D^5 \\ \infty & D^2 & D^3 & 1 & D & \infty \\ \infty & \infty & \infty & \infty & 1 & D^2 \\ \infty & \infty & \infty & \infty & \infty & 1 \end{vmatrix} =$$

$$\begin{vmatrix} 1 & D^2 & D^4 & D & D^2 & D^{10} \\ \infty & 1 & D^3 & D^2 & D^3 & D^8 \\ \infty & \infty & 1 & \infty & D & D^3 \\ \infty & D^2 & D^3 & 1 & D & D^3 \\ \infty & \infty & \infty & \infty & 1 & D^2 \\ \infty & \infty & \infty & \infty & \infty & 1 \end{vmatrix}$$

The above mathematical function is similar to ordinary matrix multiplication except, instead of summation, the minimum function is employed. As an example, to obtain the first element (i.e., first row, first column), the first row ("1 $D^2$ $D^5$ D $\infty$ $\infty$" of the cost matrix is multiplied with the first column ("1 $\infty$ $\infty$ $\infty$ $\infty$ $\infty$") of the cost matrix, and instead of summing each element, the smallest (i.e., minimum) element is selected as the first element. That is, the smallest element is selected from the following elements [1, (i.e., 1×1), $\infty$ (i.e., $D^2$×$\infty$), $\infty$ (i.e., $D^5$×$\infty$), $\infty$ (i.e., D×$\infty$), $\infty$ (i.e., $\infty$×$\infty$)], which in the instant example is one (1). As an added example, to obtain the element at row 2, column 4, the second row ("$\infty$ 1 $D^3$ $D^2$ $\infty$ $\infty$") of the cost matrix is multiplied with the fourth column ("D $D^2$ $\infty$ 1 $\infty$ $\infty$") of the cost matrix, and the smallest element from the following elements [$\infty$ (i.e., $\infty$×D), $D^2$ (i.e., 1×$D^2$), $\infty$ (i.e., $D^3$×$\infty$), $D^2$ (i.e., $D^2$×1), $\infty$ (i.e., $\infty$×$\infty$), $\infty$ (i.e., $\infty$×$\infty$)] is selected. In this case, the smallest element is $D^2$. Other elements of the $D^2_{ij}$ cost matrix are calculated similarly.

Since the elements of the matrix are either exponents of D or infinity, the multiplication reduces to exponent summation, which generally is a relatively quick and simple operation. Furthermore, since the minimum distance between any two nodes can only be one, the mathematical operation over k iterations can stop as soon as a resulting element of D having a value of one is found. Thus, the summation over k products results in replacing the infinity distance by the smallest exponent summation until either the result is one (1) or k is exhausted.

At block 550, the routing calculation block 345 determines if the next_step cost matrix is equal to the matrix of the previous step. Accordingly, in the illustrated embodiment, at the block 550, the $D^2_{ij}$ cost matrix is compared to the previous cost matrix, $D_{ij}$. The two matrixes are equal if all of the corresponding elements of the matrices are equal. Since the $D^2_{ij}$ cost matrix and the $D_{ij}$ matrix in the illustrated embodiment are not equal, at the block 530, the next_step cost matrix is re-calculated. If, at the block 550, the resultant matrix is equal to the matrix of the previous step, then it is an indication that no more processing is required because the resultant matrix represents the minimum distance between any two nodes for any given number of steps.

At the block 530, the next_step cost matrix (e.g., $D^3_{ij}$ cost matrix) is calculated using the following mathematical function:

$$i\ D^3_{ij} = \min_{k=1\ to\ 6}(D_{ik},\ D^2_{kj}),$$

where i indicates the row and j indicates the column of the cost matrix ($D_{ij}$), $D^2_{ij}$ is the previous step matrix calculated above, and k ranges from 1 to the number of nodes in the network. The resultant next_step cost matrix in the illustrated embodiment is:

$$D^3_{ij} = \begin{vmatrix} 1 & D^2 & D^5 & D & \infty & \infty \\ \infty & 1 & D^3 & D^2 & \infty & \infty \\ \infty & \infty & 1 & \infty & D & D^5 \\ \infty & D^2 & D^3 & 1 & D & \infty \\ \infty & \infty & \infty & \infty & 1 & D^2 \\ \infty & \infty & \infty & \infty & \infty & 1 \end{vmatrix} \begin{vmatrix} 1 & D^2 & D^4 & D & D^2 & D^{10} \\ \infty & 1 & D^3 & D^2 & D^3 & D^8 \\ \infty & \infty & 1 & \infty & D & D^3 \\ \infty & D^2 & D^3 & 1 & D & D^3 \\ \infty & \infty & \infty & \infty & 1 & D^2 \\ \infty & \infty & \infty & \infty & \infty & 1 \end{vmatrix} =$$

$$\begin{vmatrix} 1 & D^2 & D^4 & D & D^2 & D^4 \\ \infty & 1 & D^3 & D^2 & D^3 & D^5 \\ \infty & \infty & 1 & \infty & D & D^3 \\ \infty & D^2 & D^3 & 1 & D & D^3 \\ \infty & \infty & \infty & \infty & 1 & D^2 \\ \infty & \infty & \infty & \infty & \infty & 1 \end{vmatrix}$$

The resultant matrix, $D^3_{ij}$, illustrates the minimum distance between any two nodes (node i (row) and node j (column)) in three or fewer steps. At the block 530, the resultant next_step cost matrix (e.g., $D^3_{ij}$ cost matrix) is compared to the previous step cost matrix (e.g., $D^2_{ij}$ cost matrix) to see if the two matrices are equal. And, since in the instant case the two matrices are not equal, the next_step cost matrix, at the block 530, is computed once again.

At the block 530, the next_step cost matrix (e.g., $D^4_{ij}$ cost matrix) is calculated using the following mathematical function:

$$D^4_{ij} = \min_{k=1\ to\ 6}(D_{ij},\ D^3_{kj}),$$

where i indicates the row and j indicates the column of the cost matrix ($D_{ij}$), $D^3_{ij}$ is the previous step matrix calculated above, and k ranges from 1 to the number of nodes in the network. The resultant next_step cost matrix in the illustrated embodiment is:

$$D^4_{ij} = \begin{vmatrix} 1 & D^2 & D^5 & D & \infty & \infty \\ \infty & 1 & D^3 & D^2 & \infty & \infty \\ \infty & \infty & 1 & \infty & D & D^5 \\ \infty & D^2 & D^3 & 1 & D & \infty \\ \infty & \infty & \infty & \infty & 1 & D^2 \\ \infty & \infty & \infty & \infty & \infty & 1 \end{vmatrix} \begin{vmatrix} 1 & D^2 & D^4 & D & D^2 & D^{10} \\ \infty & 1 & D^3 & D^2 & D^3 & D^8 \\ \infty & \infty & 1 & \infty & D & D^3 \\ \infty & D^2 & D^3 & 1 & D & D^3 \\ \infty & \infty & \infty & \infty & 1 & D^2 \\ \infty & \infty & \infty & \infty & \infty & 1 \end{vmatrix} =$$

$$\begin{vmatrix} 1 & D^2 & D^4 & D & D^2 & D^4 \\ \infty & 1 & D^3 & D^2 & D^3 & D^5 \\ \infty & \infty & 1 & \infty & D & D^3 \\ \infty & D^2 & D^3 & 1 & D & D^3 \\ \infty & \infty & \infty & \infty & 1 & D^2 \\ \infty & \infty & \infty & \infty & \infty & 1 \end{vmatrix}$$

The resultant matrix, $D^4_{ij}$, illustrates the minimum distance between any two nodes (node i (row) and node j (column)) in four or fewer steps. At the block 530, the resultant next_step cost matrix (e.g., $D^4_{ij}$ cost matrix) is compared to the previous step cost matrix (e.g., $D^3_{ij}$ cost matrix) to see if the two matrices are equal. And, since all of the elements of the two matrices are equal, it is an indication that previous step matrix, $D^3_{ij}$, illustrates the minimum distance between any two nodes for any given number of steps.

Figure 6:
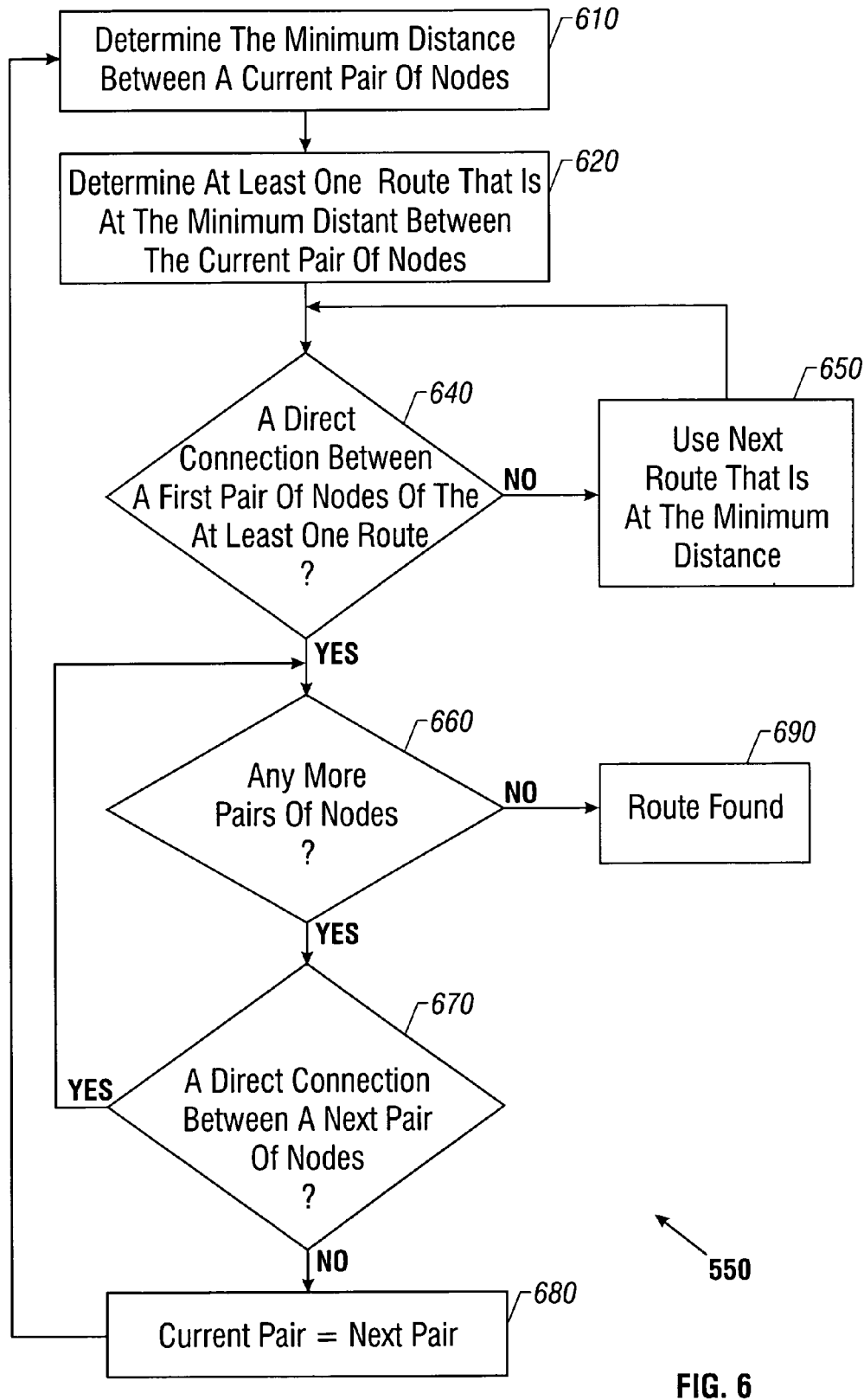
FIG. 6 is a flow diagram of a method in accordance with one embodiment of the present invention that may be implemented in the communications system of FIG. 1.

Upon calculating the minimum distance between any two nodes within the network, the routing calculation block 345, at block 550, determines the efficient route or path the data packet 250 takes by determining any or all of the intermediate nodes between the source node (e.g., first node 6) and destination node (e.g., sixth node 11). One embodiment of the block 550 is illustrated in FIG. 6. For illustrative purposes, the method of FIG. 6 is described herein with reference to a specific example of determining the shortest distance from the first node 6 to the sixth node 11. The method of FIG. 6 begins at block 610, where the routing calculation block 345 determines the minimum distance between a current pair of nodes. In one embodiment, during the first iteration, the current pair of nodes represents the source and destination nodes, which in the instant example includes the first and sixth nodes 6, 11. In one embodiment, the minimum distance is determined with reference to the element at row one, column six of the cost matrix, $D^3_{ij}$, which, as stated earlier, illustrates the minimum distance between any two nodes for any given number of steps. In this example, the minimum distance is four (4) between the first and sixth nodes 6, 11.

At block 620, the routing calculation block 345 determines at least one route/path having the minimum distance of four between the current pair (e.g., first and sixth nodes 6,11) of nodes. In one embodiment, to determine the route/path having the minimum distance of four, the IP route block 550 employs the mathematical function shown in equation (1) below.

$$D^3(F,S)\min = \min_{k=1\ to\ 6}(D^3(F)(k) * D^3(k)(S)), \quad (1)$$

where F and S represent respective first and second input nodes, and $D^3_{ij}$ is the cost matrix illustrating the minimum distance between any two nodes for any given number of steps. Equation (1) essentially determines the minimum distance between a source node and destination node and all of the intermediate nodes. Thus, in the illustrative example (where F=1 and S=6), equation (1) essentially determines the distance from the first node 6 to the sixth node 11, then distance from the first node 6 to the second node 7 and between the second node 7 to the sixth node 11, then the distance from the first node 6 to the third node 8 and third node 8 to the sixth node 11, then the distance from the first node 6 to the fourth node 9 and fourth node 9 to the sixth node 11, and so forth.

As mentioned above, in the illustrative example, F is one, and S is six. Thus, employing the mathematical expression of equation (1) to the illustrated example yields the terms $[(1)(D^4)=D^4, (D^2)(D^5)=D^7, (D^4)(D^3)=D^7, (D)(D^3)=D^4, (D^2)(D^2)=D^4, (D^4)(D^1)=D^4]$, which indicates that, aside from the first and sixth nodes 6, 11, the fourth and fifth nodes 9, 10 involve the shortest distance, namely 4. This means that that two possible minimum-distance routes from the first node 6 to the sixth node 11 are either: 1=5→6 OR 1→4→6.

Assuming that the route/path under consideration is 1→5=6, at block 640, the routing calculation block 345 determines if a direct connection exists between a first pair of nodes in the at least one route (e.g., 1→5→6). In the instant example, the first pair of nodes includes the first and fifth nodes 6, 10. In one embodiment, the connection matrix (C) depicted above is utilized to determine if a direct connection exists between the first pair. The element at row one, column five of the connection matrix is zero, which indicates that no direct connection exists between the first and fifth nodes 6, 10. Thus, at block 650, the routing calculation block 345 uses the next route (e.g., 1→4→6) of the at least one route that was calculated at the block 620.

Assuming that the route/path now under consideration is 1→4→6, at the block 640, the routing calculation block 345 determines if a direct connection exists between a first pair of nodes in the at least one route (e.g., 1→4→6). In the instant example, the first pair of nodes includes the first and fourth nodes 6, 9. Using the connection matrix, the routing calculation block 345 determines that a direct connection exists between the first and fourth nodes 6, 9 since the element at row one, column four is one.

At block 660, the routing calculation block 345 determines if any additional pair of nodes exists in the at least one route (e.g. 1→4→6) calculated at the block 620. Since another pair (4 and 6) of nodes does exist in the at least one route, at block 670, the routing calculation block 345 determines if a direct connection exists between the fourth and sixth nodes 9, 11. The routing calculation block 345 checks to see the value of the element at row four, column six to determine if a direct connection exists between the fourth and sixth nodes 9, 11. Since the value of element at the row four, column six is zero, no direct connection exists between these two nodes, which means that, at block 680, the variable "current pair of nodes" is set to equal the next pair of nodes (e.g., 4 and 6), and the process of FIG. 6 is once again repeated.

At the block 610, the routing calculation block 345 determines the minimum distance between the current pair of nodes (e.g., nodes 4 and 6). The minimum distance is determined with reference to the element at row four, column six of the cost matrix, $D^3_{ij}$, which, as mentioned before, illustrates the minimum distance is three between the fourth and sixth nodes 9, 11.

At the block 620, the routing calculation block 345 determines at least one route/path having the minimum distance of three between the current pair of nodes (e.g., fourth and sixth nodes 9,11). In one embodiment, to determine the route/path having the minimum distance of three, the routing calculation block 345 employs the mathematical function shown above in equation (1). In this case, F is four, and S is six. Thus, employing the mathematical expression of equation (1) to the illustrated example yields the terms $[(\infty)(D^4)=\infty, (D^2)(D^5)=D^7, (D^3)(D^3)=D^6, (1)(D^3)=D^3, (D)(D^2)=D^3, (D^3)(1)=D^3]$, which indicates that, aside from the fourth and sixth nodes 9, 11, the fifth node 10 involves the shortest distance, namely 3. This means that the minimum-distance route from the fourth node 9 to the sixth node 11 is 4→5→6.

Assuming that the route/path now under consideration is 4→5→6, at the block 640, the routing calculation block 345 determines if a direct connection exists between a first pair of nodes in the at least one route (e.g., 4→5→6). In the instant example, the first pair of nodes includes the fourth and fifth nodes 9, 10. Using the connection matrix, the routing calculation block 345 determines that a direct connection exists between the fourth and fifth nodes 9, 10, since the element at row four, column five is one.

At the block 660, the routing calculation block 345 determines if any additional pair of nodes exists in the at least one route (e.g., 4→5→6) that was calculated at the block 620. Since another pair (5 and 6) of nodes exist in the at least one route, at the block 670, the routing calculation block 345 determines if a direct connection exists between the fifth and sixth nodes 10, 11. Since the element at row five, column six of the connection matrix is one, the route calculation block 345 determines that a direct connection exists between the fifth and sixth nodes 10, 11.

At the block 660, the routing calculation block 345 again determines if any more pair of nodes exists in the at least one route (e.g., 4→5→6). In the instant case since no more pairs exits, at block 690, the routing calculation block 345 calculates, based on the earlier iterations, the minimum distance route/path between the first and sixth nodes 6, 11. That is, in the instant example, it is determined that the optimal route in terms of the minimum distance (e.g., 4) between the first node 6 and sixth node 11 is from the first node 6 to the fourth node 9 to the fifth node 10 to the sixth node 11 (e.g., 1→4→5→6).

Referring again to FIG. 4, at block 480, the IP output block 300 updates the IP options field 274 of the data packet 250 based on the efficient route calculated at the block 470. Thus, in the illustrated embodiment, since the shortest distance from the first host 4 to the second host 5 is through the first node, fourth node, fifth node, and sixth node, the IP output block 300 of the first router updates the IP options field 274 with the IP addresses corresponding to the fourth, fifth, and sixth nodes 9, 10, 11. In one embodiment, upon writing to the IP options field 274, the IP output block 300 of the first router 26 indicates that source routing is desired.

At block 490, the data packet 250 is transmitted to the next router, which in the illustrated embodiment is the fourth router 29. When the data packet 250 reaches the fourth router 29, it is queued and then processed by the IP options processing block 295 of the fourth router 29. And since the first router 26, at the block 480, indicates that source routing is desired, the IP options processing block 295 of the fourth router 29 provides the data packet 250 to its IP output block 300. The IP output block 300 then updates the IP options field 274 to reflect that the next destination of the data packet 250 is the fifth node 10. The above-described process continues until the data packet 250 is ultimately delivered to the second host 5.

In accordance with one embodiment of the present invention, instead of using source routing, each router that receives the data packet 250 may independently calculate a cost efficient path using the method of FIG. 5 for delivering the data packet 250 to its final destination. That is, upon calculating the next node, the router transmits the data packet 250 without indicating the use of source routing, thereby leaving it up to the receiving router to calculate the next destination. Without the use of source routing, each router may independently use the method of FIG. 5 for calculating an efficient route to deliver the data packet 250 to its final destination.

In accordance with one embodiment of the present invention, instead of determining the connection and/or cost matrices, the router 200 (see FIG. 2) may simply receive, and perhaps store, the matrices that might have been determined elsewhere. Thus, in one embodiment, upon receiving the connection and/or cost matrices, the router 200 calculates a cost efficient route from a source node to a destination node.

Although in the illustrated embodiment the connection and cost matrices are generated based on adjacent nodes, such matrices are not limited as such. That is, the connection and/or cost matrices may be based on any combination of nodes or routers (e.g., even/odd nodes or routers) in the network 3.

Some embodiments may have one or more of the following advantages. A reliable and efficient method and apparatus are provided for routing signals from a source to a destination node. In one embodiment, a data packet may be transmitted to its intended destination in a "cost" efficient manner, where the cost may be one or more of the factors such as the physical distance, delay, expense, reliability, bandwidth, load, and security between nodes. Accordingly, with the advent of the present invention, routers may, in one or more embodiments, transmit data packets to their final destination expeditiously and accurately, thereby improving network congestion.

The various system layers, routines, or modules may be executable control units (such as control unit 355) (see FIG. 2). Each control unit may include a microprocessor, a microcontroller, a processor card (including one or more microprocessors or controllers), or other control or computing devices. The storage devices referred to in this discussion may include one or more machine-readable storage media for storing data and instructions. The storage media may include different forms or memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

In the loading or transport process, data signals that are embodied in carrier waves (transmitted over telephone lines, network lines, wireless links, cables, and the like) may communicate the code segments, including instructions, to the terminal. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, comprising:
    storing a first data structure containing costs associated with transmitting data between routers in a network;
    combining the first data structure with itself to determine a cost of transmitting the data;
    transmitting the data along a route based on the calculated cost; and
    storing a second data structure defining router connections in the network,
    wherein storing the second data structure comprises storing a matrix defining router connections,
    wherein storing the first data structure comprises storing a matrix, wherein the costs are based on at least one of a distance, reliability, security, or expense of transmitting the data between routers in the network,
    wherein combining the first data structure with itself calculates the cost of transmitting the data between a source router and destination router in the network for a given number of steps at minimal cost,
    wherein the transmitting the data along the route further comprises determining the route between the source router and the destination router based on the cost matrix and the connection matrix.

2. The method of claim 1, further including determining the second data structure.

3. The method of claim 1, wherein transmitting the data comprises transmitting an IP data packet.

4. The method of claim 1, further including determining the first data structure.

5. The method of claim 1, wherein combining the first data structure with itself produces a resultant data structure that contains elements each representing a distance between a corresponding pair of routers in one hop, the method further comprising:
    combining the resultant data structure with the first data structure to produce a second resultant data structure that contains elements each representing a distance between a corresponding pair of routers in two or fewer hops.

6. The method of claim 5, further comprising:
    combining the second resultant data structure with the first data structure to produce a third resultant data structure that contains elements each representing a distance between a corresponding pair of routers in three or fewer hops.

7. An apparatus, comprising:
    an interface adapted to receive a data packet;
    at least one storage device to store:
        a first data structure defining router connections in a network; and
        a second data structure that defines a cost associated with links between routers in the network; and
    a controller adapted to:
        combine the second data structure with itself at least once to determine a cost for transmitting the data packet; and
        determine a route based on the first data structure and the determined cost for transmitting the data packet.

8. The apparatus of claim 7, wherein the first data structure comprises a first matrix that defines the router connections in the network wherein the router connections comprise adjacent router connections.

9. The apparatus of claim 8, wherein the second data structure comprises a second matrix that defines the cost associated with each link between adjacent routers as exponents.

10. The apparatus of claim 9, wherein the cost of each link between a router and itself is defined as zero and the cost for each link from a router to a non-adjacent router is defined as infinity.

11. The apparatus of claim 10, wherein the controller is adapted to combine the second matrix using the formula $\min_{1\ to\ k} (D_{ik} * D_{kj})$, wherein k is the number of the routers and the second matrix is represented by D that has i rows and j columns.

12. The apparatus of claim 9, wherein the costs are based on at least one of a distance, reliability, security, or expense of transmitting the data packet between the adjacent routers in the network.

13. The apparatus of claim 9, wherein the controller is further adapted to combine the second matrix with itself a plurality of times until the cost of transmitting the data packet between a source router and destination router is minimum for a given number of steps.

14. The apparatus of claim 7, wherein the controller is adapted to determine a direct connection between each link of the route based on the first data structure.

15. The apparatus of claim 7, wherein the controller is further adapted to transmit the data packet along the route.

16. The apparatus of claim 7, wherein the data packet is an IP data packet.

17. The apparatus of claim 7, wherein the controller is adapted to produce, based on combining the second data structure with itself, a resultant data structure $D^1$ containing elements each representing a distance between a corresponding pair of routers in one hop, the controller adapted to further produce resultant data structures $D^m$, where m is two and greater, based on combining the resultant data structure $D^{m-1}$ with the second data structure, where $D^m$ contains elements that represent distances between corresponding pairs of routers in m or fewer hops.

18. The apparatus of claim 17, wherein the controller is adapted to iteratively increment m until the controller has identified a resultant data structure $D^m$ that contains elements that represent minimum distances between corresponding pairs of routers.

19. An article comprising at least one machine-readable storage medium containing instructions for routing a data packet, the instructions when executed causing a controller to:
represent node connections in a network in a first matrix;
represent costs of transmitting the data packet among a plurality of nodes in a second matrix, the second matrix containing elements expressed as exponents each representing distances between corresponding pairs of nodes; and
determine a route to transmit the data packet based on the first matrix and the second matrix.

20. The article of claim 19, wherein the instructions when executed cause the controller to transmit the data packet over the route.

21. The article of claim 19, wherein the instructions when executed cause the controller to represent adjacent node connections in the first matrix.

22. The article of claim 19, wherein the instructions when executed cause the controller to represent a cost between each node and itself as zero and each node to a non-adjacent node as infinity.

23. The article of claim 19, wherein the instructions when executed cause the controller to represent the costs including at least one of a distance, reliability, security, or expense of transmitting the data packet between each of the plurality of nodes.

24. The article of claim 19, wherein the instructions when executed cause the controller to combine the second matrix with itself a plurality of times until the costs of transmitting the data packet between a source node and destination node are minimum for a given number of steps.

25. The article of claim 19, wherein the instructions when executed cause the controller to determine the route to transmit an IP data packet.

26. The article of claim 19, wherein the instructions when executed cause the controller to:
combine the second matrix with itself to produce a first resultant matrix $D^1$ that contains elements representing distances between corresponding pairs of routers in one hop; and
produce additional resultant matrices $D^m$, m being two and greater, by combining the resultant matrix $D^{m-1}$ with the second matrix, each resultant matrix $D^m$ containing elements representing distances between corresponding pairs of routers in m or fewer hops.

27. An article comprising at least one machine-readable storage medium containing instructions for routing a data packet, the instructions when executed causing a controller to:
represent node connections in a network in a first matrix;
represent costs of transmitting the data packet among a plurality of nodes in a second matrix;
determine a route to transmit the data packet based on the first matrix and the second matrix; and
combine the second matrix using the formula $\min_{1\ to\ k} (D_{ik} * D_{kj})$, wherein k is the number of the routers and the second matrix is represented by D that has i rows and j columns.

28. A data signal embodied in a carrier wave comprising instructions for routing a data packet to at least one of a plurality of network entities, the instructions when executed causing a controller to:
store a connection matrix indicating adjacent nodes in a network;
store a cost matrix expressing transmission costs as exponents; and
determine a route for transmitting the data packet based on the connection and cost matrices from a first node to a second node.

29. The data signal of claim 28, wherein the instructions when executed cause the controller to transmit the packet data over the route.

* * * * *